(12) United States Patent
St. Jean et al.

(10) Patent No.: US 9,284,389 B2
(45) Date of Patent: Mar. 15, 2016

(54) BIMODAL RESINS HAVING GOOD FILM PROCESSABILITY

(71) Applicant: Chevron Phillips Chemical Company LP, The Woodlands, TX (US)

(72) Inventors: Guylaine St. Jean, Bartlesville, OK (US); Qing Yang, Bartlesville, OK (US); J. Todd Lanier, Bartlesville, OK (US)

(73) Assignee: CHEVRON PHILLIPS CHEMICAL COMPANY LP, The Woodlands, TX (US)

( * ) Notice: Subject to any disclaimer, the term of this patent is extended or adjusted under 35 U.S.C. 154(b) by 0 days.

(21) Appl. No.: 14/445,793

(22) Filed: Jul. 29, 2014

(65) Prior Publication Data

US 2016/0032027 A1  Feb. 4, 2016

(51) Int. Cl.
  *C08F 10/14* (2006.01)
(52) U.S. Cl.
  CPC ........................................ *C08F 10/14* (2013.01)
(58) Field of Classification Search
  CPC ........................................................ C08F 10/14
  See application file for complete search history.

(56) References Cited

U.S. PATENT DOCUMENTS

| | | | |
|---|---|---|---|
| 3,248,179 A | 4/1966 | Norwood | |
| 4,501,885 A | 2/1985 | Sherk et al. | |
| 4,588,790 A | 5/1986 | Jenkins, III et al. | |
| 5,352,749 A | 10/1994 | DeChellis et al. | |
| 5,436,304 A | 7/1995 | Griffin et al. | |
| 5,455,314 A | 10/1995 | Burns et al. | |
| 5,565,175 A | 10/1996 | Hottovy et al. | |
| 5,575,979 A | 11/1996 | Hanson | |
| 6,239,235 B1 | 5/2001 | Hottovy et al. | |
| 6,262,191 B1 | 7/2001 | Hottovy et al. | |
| 6,833,415 B2 | 12/2004 | Kendrick et al. | |
| 7,226,886 B2 | 6/2007 | Jayaratne et al. | |
| 7,312,283 B2 | 12/2007 | Martin et al. | |
| 7,517,939 B2 | 4/2009 | Yang et al. | |
| 2007/0043182 A1 | 2/2007 | Martin et al. | |
| 2007/0197374 A1* | 8/2007 | Yang et al. | ..................... 502/103 |
| 2014/0128563 A1 | 5/2014 | McDaniel et al. | |

FOREIGN PATENT DOCUMENTS

| | | |
|---|---|---|
| WO | 2004101674 A1 | 11/2004 |
| WO | 2015138674 A1 | 9/2015 |

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
Hieber, C. A., et al., "Shear-Rate-Dependence Modeling of Polymer Melt Viscosity," Jul. 1992, pp. 931-938, vol. 32, No. 14, Polymer Engineering and Science.
Hieber, C. A., et al., "Some correlations involving the shear viscosity of polystyrene melts," 1989, pp. 321-332, vol. 28, No. 4, Rheologica Acta.
Foreign communication from a related counterpart application—International Search Report and Written Opinion, PCT/US2015/041549, Jan. 5, 2016, 4 pages.

* cited by examiner

*Primary Examiner* — Robert Harlan
(74) *Attorney, Agent, or Firm* — Conley Rose, P.C.; Rodney B. Carroll; Cheryl L. Huseman

(57) ABSTRACT

A bimodal polyethylene copolymer comprising a lower molecular weight (LMW) component and a higher molecular weight (HMW) component, the copolymer having a z-average molecular weight ($M_z$) of from about 1,000 kg/mol to about 2,500 kg/mol, a weight fraction of the LMW component (LMW fr.) of from about 0.60 to 0.85, a ratio of a weight average molecular weight ($M_w$) of the HMW component (HMW $M_w$) to a $M_w$ of the LMW component (LMW $M_w$) of from about 14 to about 25, a zero shear viscosity ($\eta_0$) of from about $5 \times 10^5$ Pa-s to about $1 \times 10^7$ Pa-s and a HMW $M_w$ of from about 800 kg/mol to about 1,500 kg/mol.

21 Claims, 2 Drawing Sheets

BIMODAL RESINS HAVING GOOD FILM PROCESSABILITY

FIELD

The present disclosure relates to novel polymer compositions and film made from same, more specifically to polyethylene compositions having good film processability.

BACKGROUND

Polyolefins are plastic materials useful for making a wide variety of valued products due to their combination of stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass, metal or paper. One of the most valued products is plastic films. Plastic films such as PE films are mostly used in packaging applications but they also find utility in the agricultural, medical and engineering fields.

PE films can be manufactured via extrusion from a variety of resins, such as for example bimodal resins (e.g., dual metallocene resins), unimodal resins (e.g., chromium resins), etc. Generally, some bimodal resins have poor film processability when compared to unimodal resins, e.g., some bimodal resins are notoriously more difficult to extrude than unimodal resins, as they require a significantly higher extrusion pressure. However, PE films manufactured from unimodal resins often lack in film properties (e.g., strength, tear, etc.) against bimodal resins. An ongoing need exists for bimodal polymer compositions having improved film processability.

SUMMARY

Disclosed herein is a bimodal polyethylene copolymer comprising a lower molecular weight (LMW) component and a higher molecular weight (HMW) component, the copolymer having a z-average molecular weight ($M_z$) of from about 1,000 kg/mol to about 2,500 kg/mol, a weight fraction of the LMW component (LMW fr.) of from about 0.60 to 0.85, a ratio of a weight average molecular weight ($M_w$) of the HMW component (HMW $M_w$) to a $M_w$ of the LMW component (LMW $M_w$) of from about 14 to about 25, a zero shear viscosity ($\eta_0$) of from about $5 \times 10^5$ Pa-s to about $1 \times 10^7$ Pa-s and a HMW $M_w$ of from about 800 kg/mol to about 1,500 kg/mol.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
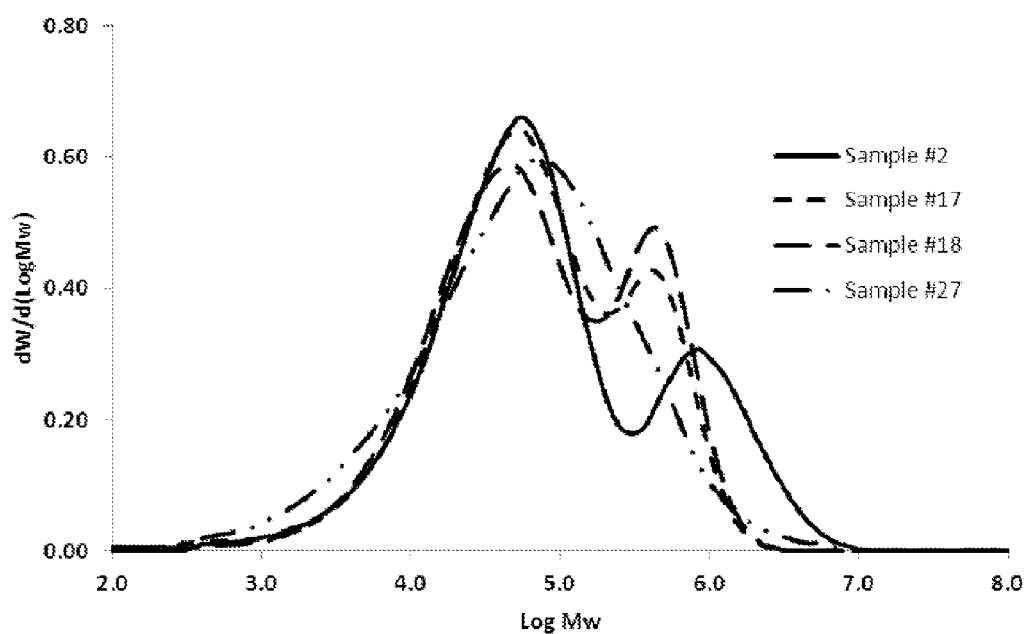
FIG. 1 is a size exclusion chromatograph overlay of samples from Example 2.

Disclosed herein are polyethylene (PE) copolymers, PE films, and methods of making same. Such methods can comprise preparing a PE copolymer and forming the PE copolymer into a film. In an aspect, the PE copolymer comprises a multimodal PE copolymer and the film prepared therefrom, wherein the multimodal PE copolymer can display improved film processability, and wherein the film displays the enhanced mechanical properties of similar films manufactured from other multimodal PE copolymers.

The PE copolymers of the present disclosure can be formed using any suitable olefin polymerization method which can be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

The various types of reactors include those that can be referred to as batch, slurry, gas-phase, solution, high pressure, tubular, or autoclave reactors. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Processes can also include partial or full direct recycle of un-reacted monomer, un-reacted co-monomer, and/or diluent.

Polymerization reactor systems of the present disclosure can comprise one type of reactor in a system or multiple reactors of the same or different type. Production of polymers in multiple reactors can include several stages in at least two separate polymerization reactors interconnected by a transfer device making it possible to transfer the polymers resulting from a first polymerization reactor into a second reactor. The desired polymerization conditions in one of the reactors can be different from the operating conditions of the other reactors. Alternatively, polymerization in multiple reactors can include the manual transfer of polymer from one reactor to subsequent reactors for continued polymerization. Multiple reactor systems can include any combination including, but not limited to, multiple loop reactors, multiple gas reactors, a combination of loop and gas reactors, multiple high pressure reactors, or a combination of high pressure with loop and/or gas reactors. The multiple reactors can be operated in series or in parallel.

According to one aspect of the disclosure, the polymerization reactor system can comprise at least one loop slurry reactor comprising vertical and/or horizontal loops. Monomer, diluent, catalyst and optionally any co-monomer can be continuously fed to a loop reactor where polymerization occurs. Generally, continuous processes can comprise the continuous introduction of a monomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or co-monomer. Various technologies can be used for this separation step including but not limited to, flashing that can include any combination of heat addition and pressure reduction; separation by cyclonic action in either a cyclone or hydrocyclone; or separation by centrifugation.

A suitable slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455, 314, which is incorporated by reference herein in its entirety.

According to yet another aspect of this disclosure, the polymerization reactor can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to still another aspect of the disclosure, a high pressure polymerization reactor can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the disclosure, the polymerization reactor can comprise a solution polymerization reactor wherein the monomer is contacted with the catalyst composition by suitable stirring or other means. A carrier comprising an inert organic diluent or excess monomer can be employed. If desired, the monomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactors suitable for the present disclosure can further comprise any combination of at least one raw material feed system, at least one feed system for catalyst or catalyst components, and/or at least one polymer recovery system. Suitable reactor systems for the present disclosure can further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight and molecular weight distribution. Suitable polymerization temperature can be any temperature below the de-polymerization temperature according to the Gibbs free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1,000 psig. Pressure for gas phase polymerization is usually at about 200 psig to about 500 psig. High pressure polymerization in tubular or autoclave reactors is generally run at about 20,000 psig to about 75,000 psig. Polymerization reactors can also be operated in a supercritical region occurring at generally higher temperatures and pressures. Operation above the critical point of a pressure/temperature diagram (supercritical phase) can offer advantages.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, hydrogen, modifiers, and electron donors can be utilized in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an embodiment, hydrogen is added to the reactor during polymerization. Alternatively, hydrogen is not added to the reactor during polymerization.

In an embodiment, a PE resin of the type described herein comprises a polymer blend, e.g., a blend of two or more component polymers such as a higher molecular weight (HMW) component and a lower molecular weight (LMW) component. The polymer blend (e.g., copolymer blend) can be of any type compatible with and able to produce a PE resin of the type described herein. For example, the PE resin can be a physical or mechanical blend of polymers (e.g., polymer blend), alternatively the PE resin can be a reactor blend of polymers. In an embodiment, a process for the preparation of a PE resin of the type disclosed herein comprises the preparation of each component of the PE resin independent of the other components. The process can comprise polymerization of an alpha-olefin monomer in the presence of a catalyst system under a first set of reaction conditions to form a first component of the PE resin. The process can further comprise polymerization of an alpha-olefin in the presence of a catalyst system under a second set of reaction conditions to form a second component of the PE resin. The formation of the second component can be carried out in the presence of the first component (e.g., a reactor blend) or in the absence of the first component (and the two components subsequently blended, for example via mechanical blending, co-extrusion, etc.). In some embodiments, the formation of both the first component and the second component can be carried out in the same reactor. In other embodiments, the formation of the first component and formation of the second component can be carried out in different reactors (e.g., the formation of a first component can be carried out in a first reactor, and the formation of the second component can be carried out in a second reactor; the formation of a first component can be carried out in a first reactor, the first component can be transferred to a second reactor, and the formation of the second component can be carried out in the second reactor in the presence of the first component; etc.). It is to be understood that adjustments of the reaction conditions to which the catalyst system is subjected during polymerization can substantively alter the resultant product. A process for preparation of a PE resin can further comprise contacting the first and second components utilizing any appropriate methodology (e.g., mechanical mixing). In such an embodiment, the resultant PE resin comprises a physical blend of the first and second component.

The polymer or resin can be formed into various articles, including, but not limited to pipes, bottles, toys, containers, utensils, film products, drums, tanks, membranes, and liners. Various processes can be used to form these articles, including, but not limited to, film blowing and cast film, blow molding, extrusion molding, rotational molding, injection molding, fiber spinning, thermoforming, cast molding, and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

The PE copolymer can include other suitable additives. Such additives can be used singularly or in combination and can be included in the polymer composition before, during or after preparation of the PE copolymer as described herein. Such additives can be added via known techniques, for example during an extrusion or compounding step such as during pelletization or subsequent processing into an end use article. Herein the disclosure will refer to a PE copolymer although a polymer composition comprising the PE copolymer and one or more additives is also contemplated.

Any catalyst composition capable of producing a PE copolymer of the type disclosed herein can be employed in the production of the copolymer. For example, a catalyst composition for the production of a PE copolymer of the type disclosed herein can include at least two metallocenes that are selected such that the copolymers produced therefrom have two distinctly different molecular weights. The first metallocene can be a tightly-bridged metallocene that produces a high molecular weight polymer. The second metallocene is generally not bridged and is more responsive to chain termination reagents, such as hydrogen, than the first metallocene. The metallocenes can be combined with an activator, an aluminum alkyl compound, an olefin monomer, and an olefin comonomer to produce the desired polyolefin. The activity and the productivity of the catalyst can be relatively high. As used herein, the activity refers to the grams of copolymer produced per gram of solid catalyst charged per hour, and the productivity refers to the grams of copolymer produced per gram of solid catalyst charged. Such catalysts are disclosed for example in U.S. Pat. Nos. 7,517,939, 7,312,283, and 7,226,886, each of which is incorporated herein by reference in its entirety.

In an embodiment, a catalyst composition comprises a first metallocene compound, a second metallocene compound, an activator and optionally an organoaluminum compound. The first metallocene compound can be characterized by the general formula:

$$(X^1R^1)(X^2R^2_2)(X^3)(X^4)M^1;$$

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group can be a phenyl group. The second substituent of the disubstituted bridging group can be a phenyl group, an alkyl group, a butenyl group, a pentenyl group, or a hexenyl group.

The second metallocene compound can be characterized by the general formula:

$$(X^5)(X^6)(X^7)(X^8)M^2;$$

wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf.

In an embodiment of the present disclosure, the ratio of the first metallocene compound to the second metallocene compound can be from about 1:10 to about 10:1. According to other aspects of the present disclosure, the ratio of the first metallocene compound to the second metallocene compound can be from about 1:5 to about 5:1. According to yet other aspects of the present disclosure, the ratio of the first metallocene compound to the second metallocene compound can be from about 1:2 to about 2:1.

In an embodiment of the present disclosure, the activator can be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide," "solid oxide activator-support," "acidic activator-support," "activator-support," "treated solid oxide compound," and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The terms "support" and "activator-support" are not used to imply these components are inert, and such components should not be construed as an inert component of the catalyst composition.

The organoaluminum compound used with the present disclosure can have the formula:

$(R^3)_3Al;$ in which ($R^3$) is an aliphatic group having from 2 to about 6 carbon atoms. In some instances, ($R^3$) is ethyl, propyl, butyl, hexyl, or isobutyl.

In an embodiment, the catalysts are chosen from compounds like those represented by the chemical structures A and B with sulfated alumina as the activator-support and with tri-isobutylaluminum (TIBA) as the co-catalyst.

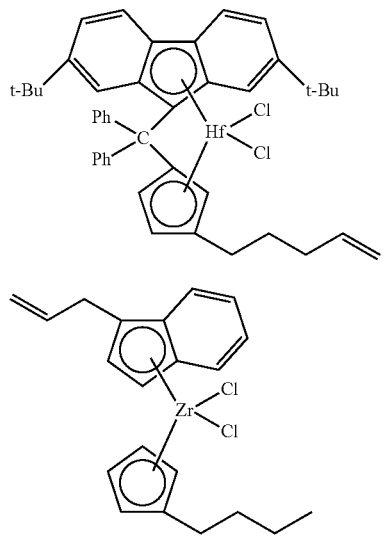

The PE copolymer and/or individual components of the PE copolymer can comprise a polyethylene copolymer. In an embodiment, the PE copolymer is a copolymer of ethylene with one or more comonomers such as alpha olefins. In an embodiment, the comonomer can comprise unsaturated hydrocarbons having from 3 to 20 carbon atoms. Nonlimiting examples of alpha olefins suitable for use as comonomers in the present disclosure include propylene, 1-butene, 1-pentene, 1-hexene, 3-methyl-1-butene, 4-methyl-1-pentene, 1-heptene, 1-octene, 1-nonene, 1-decene, and the like, or combinations thereof. In an embodiment, the comonomer comprises 1-hexene.

In an embodiment, the PE copolymer is a multimodal resin. Herein, the "modality" of a polymer resin (e.g., PE copolymer) refers to the form of its molecular weight distribution curve, i.e., the appearance of a graph of the polymer weight fraction, frequency, or number as a function of its molecular weight. The polymer weight fraction refers to the weight fraction of molecules of a given size. A polymer resin can have two or more components that can be distinguishable from one another, for example based upon their individual composition and/or molecular weight distribution. A molecular weight distribution curve can be prepared for each individual component of the polymer resin.

The molecular weight distribution curves for the individual components can be superimposed onto a common chart to form the weight distribution curve for the polymer resin as a whole. Upon such superimposition, the resultant curve for the polymer resin as a whole can be multimodal or show n distinct peaks corresponding to n polymer components of differing molecular weight distributions. For example, a polymer having a molecular weight distribution curve showing a single peak can be referred to as a unimodal polymer, a polymer having a curve showing two distinct peaks can be referred to as a bimodal polymer, a polymer having a curve showing three distinct peaks can be referred to as a trimodal polymer, etc. Polymers having molecular weight distribution curves showing more than one peak can be collectively referred to as multimodal polymers (e.g., multimodal copolymers) or resins. Furthermore, the distinct peaks can correspond to components exhibiting distinct characteristics. For example, a bimodal polymer (e.g., bimodal copolymer) resin can show two distinct peaks corresponding to two individual components of differing molecular weights.

In an embodiment, the PE copolymer is a bimodal PE resin. In such embodiments, the PE copolymer comprises a higher molecular weight (HMW) component and a lower molecular weight (LMW) component. In such embodiments, a weight fraction of LMW component (LMW fr.) in the PE copolymer can have values of from about 0.6 to about 0.85, alternatively from about 0.65 to about 0.8, or alternatively from about 0.7 to about 0.75; while the weight fraction of the HMW component (HMW fr.) in the PE copolymer can have values of from about 0.15 to about 0.4, alternatively from about 0.2 to about 0.35, or alternatively from about 0.25 to about 0.3. As will be appreciated by one of skill in the art, and with the help of this disclosure, (LMW fr.+HMW fr.)=1.

In an embodiment, the PE copolymer can be characterized by a HMW fr./LMW fr. ratio of from about 0.2 to about 0.5, alternatively from about 0.25 to about 0.5, or alternatively from about 0.3 to about 0.5.

The PE copolymers disclosed herein can have a variety of properties and parameters described below either singularly or in combination. Any suitable methodology can be employed for determination of these properties and parameters.

In an embodiment, the PE copolymer as a whole can be characterized by a weight average molecular weight ($M_w$) of from about 200 kg/mol to about 600 kg/mol, alternatively from about 250 kg/mol to about 550 kg/mol, or alternatively from about 300 kg/mol to about 500 kg/mol; a number average molecular weight ($M_n$) of from about 15 kg/mol to about 30 kg/mol, alternatively from about 17 kg/mol to about 25 kg/mol, or alternatively from about 19 kg/mol to about 23 kg/mol; and a z-average molecular weight ($M_z$) of from about 1,000 kg/mol to about 2,500 kg/mol, alternatively from about 1,200 kg/mol to about 2,300 kg/mol, alternatively from about 1,300 kg/mol to about 2,100 kg/mol, or alternatively from about 1,500 kg/mol to about 2,000 kg/mol. The weight average molecular weight describes the size average (e.g., molecular weight distribution) of a polymer (e.g., PE copolymer) composition and can be calculated according to equation 1:

$$M_w = \frac{\sum_i N_i M_i^2}{\sum_i N_i M_i} \quad (1)$$

wherein $N_i$ is the number of molecules of molecular weight $M_i$. All molecular weight averages are expressed in gram per mole (g/mol) or Daltons (Da), or in kg/mol or kDa. The number average molecular weight is the common average of the molecular weights of the individual polymers and can be calculated by measuring the molecular weight $M_i$ of $N_i$ polymer molecules, summing the weights, and dividing by the total number of polymer molecules, according to equation 2:

$$M_n = \frac{\sum_i N_i M_i}{\sum_i N_i} \quad (2)$$

wherein $N_i$ is the number of molecules of molecular weight $M_i$. The z-average molecular weight is a higher order molecular weight average which is calculated according to equation 3:

$$M_z = \frac{\sum_i N_i M_i^3}{\sum_i N_i M_i^2} \quad (3)$$

wherein $N_i$ is the number of molecules of molecular weight $M_i$.

The LMW component of the PE copolymer can be characterized by a $M_w$ (LMW $M_w$) of from about 40 kg/mol to about 80 kg/mol, alternatively from about 45 kg/mol to about 75 kg/mol, or alternatively from about 50 kg/mol to about 70 kg/mol; while the HMW component of the PE copolymer can be characterized by a $M_w$ (HMW $M_w$) of from about 800 kg/mol to about 1,500 kg/mol, alternatively from about 1,000 kg/mol to about 1,450 kg/mol, or alternatively from about 1,100 kg/mol to about 1,400 kg/mol.

In an embodiment, the PE copolymer can be characterized by a HMW $M_w$/LMW $M_w$ ratio of from about 14 to about 25, alternatively from about 16 to about 23, or alternatively from about 18 to about 20.

In an embodiment, the PE copolymers of this disclosure as a whole can be characterized by a molecular weight distribution (MWD) of from about 10 to about 25, alternatively from about 12 to about 22, or alternatively from about 15 to about 20. The MWD is the ratio of the $M_w$ to the $M_n$ ($M_w/M_n$), which can also be referred to as the polydispersity index (PDI) or more simply as polydispersity.

In an embodiment, the PE copolymers of this disclosure as a whole can be further characterized by a ratio of the $M_z$ to the $M_w$ ($M_z/M_n$) of from about 4 to about 8, alternatively from about 4.5 to about 7.5, or alternatively from about 5 to about 7. The ratio $M_z/M_w$ is another indication of the breadth of the MWD of a polymer (e.g., PE copolymer).

In an embodiment the LMW component of the PE copolymer is characterized by a MWD of from about 2 to about 5, alternatively from about 2.5 to about 4.5, or alternatively from about 3 to about 4.

In an embodiment, the HMW component of the PE copolymer is characterized by a MWD of from about 2 to about 5, alternatively from about 2 to about 4, or alternatively from about 2 to about 3.

In an embodiment, the PE copolymers of this disclosure as a whole can be further characterized by a high load melt index (HLMI) under a force of 21.6 kg ($I_{21.6}$) of from about 8 g/10 min to about 30 g/10 min, alternatively from about 10 g/10 min to about 25 g/10 min, or alternatively from about 15 g/10 min to about 20 g/10 min. The HLMI represents the rate of flow of a molten resin through an orifice of 0.0825 inch diameter when subjected to a force of 21.6 kg in ten minutes at 190° C., as determined in accordance with ASTM D1238.

In an embodiment, the PE copolymers of this disclosure as a whole can be further characterized by a density of from about 0.930 g/cc to about 0.950 g/cc, alternatively from about 0.935 g/cc to about 0.950 g/cc, or alternatively from about 0.940 g/cc to about 0.945 g/cc. The density refers to the mass per unit volume of polymer (e.g., PE copolymer) and can be determined in accordance with ASTM D1505.

In an embodiment, the PE copolymers of this disclosure as a whole can be further characterized by a $\eta_{100}$ of from about 1,000 Pa-s to about 2,500 Pa-s, alternatively from about $\eta_{100}$ Pa-s to about 2,200 Pa-s, alternatively from about 1,150 Pa-s to about 1,900 Pa-s, wherein $\eta_{100}$ is the viscosity of the copolymer expressed in Pa-s and measured at 190° C. and a shear rate of 100 rad/s.

The viscosity can be obtained by assuming the Cox-Merz rule and calculated by fitting flow curves generated in linear-viscoelastic dynamic oscillatory frequency sweep experiments with a modified Carreau-Yasuda (CY) model, which is represented by equation 4:

$$|\eta^*(\omega)| = \eta_o [1 + (\tau_\eta \omega)^a]^{\frac{n-1}{a}} \quad (4)$$

wherein
$|\eta^*(\omega)|$=magnitude of the complex shear viscosity (Pa-s);
$\eta_o$=zero shear viscosity (Pa-s) [defines the Newtonian plateau];
$\omega$=angular frequency of oscillatory shear deformation (i.e., shear rate (1/s));
a=rheological breadth parameter;
$\tau_\eta$=viscous relaxation time (s) [describes the location in time of the transition region];
n=power law constant [defines the final slope of the high shear rate region].

To facilitate model fitting, the power law constant n is held at a constant value (i.e., 0.1818). The dynamic shear viscosities can be measured experimentally, and the data can be fit to the CY equation 4 to determine $\eta_o$ values and other rheological parameters. Details of the significance and interpretation of the CY model and derived parameters can be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

The zero shear viscosity ($\eta_o$) refers to the viscosity of the copolymer at a zero shear rate and is indicative of the molecular structure of materials. Further, for polymer melts, the zero shear viscosity is often an useful indicator of processing attributes such as melt strength in blow-molding and foam technologies and bubble stability in film blowing. For example, the higher the zero shear viscosity, the better the melt strength or bubble stability. In an embodiment, the PE copolymers of this disclosure as a whole can be characterized by a zero shear viscosity ($\eta_o$), defined by equation 4, of from about $5 \times 10^5$ Pa-s to about $1 \times 10^7$ Pa-s, alternatively from about $7.5 \times 10^5$ Pa-s to about $7.5 \times 10^6$ Pa-s, alternatively from about $1 \times 10^6$ Pa-s to about $5 \times 10^6$ Pa-s, alternatively greater than about $5 \times 10^5$ Pa-s, alternatively greater than about $7.5 \times 10^5$ Pa-s, or alternatively greater than about $1 \times 10^6$ Pa-s.

In an embodiment, the PE copolymers of this disclosure as a whole can have a processability characterized by a pressure index of greater than about $(1.1 \times \eta_{100}+50)$ and a bubble stability index of less than about $(0.96 \times (\eta_0/10000)-15)$. For purposes of the disclosure herein, the term "processability" refers to the ability (e.g., ease of) of extruding the copolymer with conventional polymer extruder to transform it into an end product, such as for example a film. Further, for purposes of the disclosure herein, "pressure index" and "bubble stability index" are terms that refer to a calculated number based on the molecular composition and characteristics that enable a user to estimate the potential extrusion pressure required to convey a polymer (e.g., a PE copolymer) through an extruder and to predict the stability of the bubble during a blown film operation.

In an embodiment, the pressure index can be defined by Equation (5):

pressure index=5737−563*(HMW $M_w$/LMW $M_w$)−209*(HMW fr./LMW fr.)+7*$M_z$−1234*$M_z/M_w$+404*(HMW $M_w$/LMW $M_w$*HMW fr./LMW fr.)−0.22*(HMW $M_w$/LMW $M_w$*$M_z$)+139*(HMW $M_w$/LMW $M_w$*$M_z/M_w$)+2*(HMW fr./LMW fr.*$M_z$)−1591*(HMW fr./LMW fr.*$M_z/M_w$)−0.64*($M_z$*$M_z/M_w$) [Equation 5]

In an embodiment, the bubble stability index can be defined by Equation (6):

bubble stability index=1.31×10⁴−2.76×10³*(HMW $M_w$/LMW $M_w$)−1.46×10⁵*(HMW fr./LMW fr.)+4.16×10²*$M_z$−2.43×10⁴*$M_z/M_w$ [Equation 6]

In an embodiment, a PE copolymer of this disclosure can be fabricated into a film. The films of this disclosure can be produced using any suitable methodology. In an embodiment, the polymeric compositions are formed into films through a blown film process. In a blown film process, plastic melt is extruded through an annular slit die, usually vertically, to form a thin walled tube. Air is introduced via a hole in the center of the die to blow up the tube like a balloon. Mounted on top of the die, a high-speed air ring blows onto the hot film to cool it. The tube of film then continues upwards, continually cooling, until it passes through nip rolls where the tube is flattened to create what is known as a lay-flat tube of film. This lay-flat or collapsed tube is then taken back down the extrusion tower via more rollers. On higher output lines, the air inside the bubble is also exchanged. This is known as Internal Bubble Cooling (IBC).

The lay-flat film is then either kept as such or the edges of the lay-flat are slit off to produce two flat film sheets and wound up onto reels. Typically, the expansion ratio between die and blown tube of film would be 1.5 to 4 times the die diameter. The films are extruded using "HDPE film" or "high-stalk extrusion" conditions with a neck height (freeze line height) to die diameter ratio from about 6:1 to about 10:1. The drawdown between the melt wall thickness and the cooled film thickness occurs in both radial and longitudinal directions and is easily controlled by changing the volume of air inside the bubble and by altering the haul off speed. The films formed from PE copolymers of this disclosure can be of any thickness desired by the user. Alternatively, the PE copolymers of this disclosure can be formed into films having a thickness of from about 0.5 mils (12.5 μm) to about 2.5 mils (63.5 μm), alternatively from about 0.8 mil (20.3 μm) to about 2 mils (50.8 μm), or alternatively from about 1 mil (25.4 μm) to about 1.65 mils (41.9 μm).

In an embodiment, films formed from PE copolymers of this disclosure can have a dart drop strength, also termed a dart impact strength, ranging from about 100 g to about 450 g, alternatively from about 125 g to about 425 g, or alternatively from about 150 g to about 400 g, as measured in accordance with ASTM D1709 Method A using a test specimen having a 1 mil thickness. The dart drop strength refers to the weight required to cause 50% of tested films to fail by impact from a falling dart under specified test conditions. Specifically, one method employs the use of a dart having a 38 mm (1.5 in) head diameter dropped from a height of 0.66 m (26 in).

In an embodiment, films formed from PE copolymers of this disclosure can have an Elmendorf tear strength in the machine direction (MD) ranging from about 25 g to about 75 g, alternatively from about 27 g to about 65 g, or alternatively from about 30 g to about 50 g, as measured in accordance with ASTM D1922 using a test specimen having a 1.0 mil thickness. In an embodiment, films formed from PE copolymers of this disclosure have an Elmendorf tear strength in the transverse direction (TD) of from about 300 g to about 500 g, alternatively from about 325 g to about 475 g, alternatively from about 350 g to about 450 g, as measured in accordance with ASTM D1922 using a test specimen having a 1.0 mil thickness. The Elmendorf tear strength refers to the average force required to propagate tearing through a specified length of plastic film or nonrigid sheeting on an Elmendorf-type tear tester. Specifically, test specimens having a pre-cut slit are contacted with a knife-tipped pendulum. The average force required to propagate tearing is calculated from the pendulum energy lost while tearing the test specimen. The tear can be propagated either in the MD or TD.

In an embodiment, films formed from PE copolymers of this disclosure can be used in the formation of any variety of end-use articles. These end-use articles can include without limitation merchandise bags, t-shirt bags, trash can liners, grocery sacks, produce bags, food packaging containers, food packaging for contents such as cereals, crackers, cheese, meat, etc., shrink wrap and other items. Other nonlimiting examples of end-use articles include containers (e.g., food packaging container), thermoformed articles, sheets, cups, trays, pallets, toys, or a component of another product. In an embodiment, the PE copolymers of this disclosure can be formed into films which can be useful in food packaging.

In an embodiment, a PE copolymer of this disclosure comprises a bimodal copolymer comprising a LMW component and a HMW component, wherein the bimodal copolymer has an $M_z$ of from about 1,000 kg/mol to about 2,500 kg/mol, a LMW fr. of from about 0.60 to 0.85, a HMW $M_w$/LMW $M_w$ ratio of from about 14 to about 25, an $\eta_0$ of from about 5×10⁵ Pa-s to about 1×10⁷ Pa-s and a HMW $M_w$ of from about 800 kg/mol to about 1,500 kg/mol. In such embodiment, the PE copolymer comprises a copolymer of ethylene with 1-hexene. In such embodiment, the PE copolymer can be formed into a film with a dart drop strength of from about 100 g to about 450 g, an Elmendorf MD tear strength of from about 25 g to about 75 g, and an Elmendorf TD tear strength of from about 300 g to about 500 g.

In an embodiment, the PE copolymer of this disclosure can advantageously display improved processability when compared to other dual metallocene resins. Generally, dual metallocene resins are notoriously more difficult to extrude because of a narrower molecular weight distribution of their components, while chromium resins are recognized for their excellent processing features such as bubble stability, but often lack in film properties against bimodal resins such as dual metallocene resins. Generally, film extrusion of conventional dual metallocene resins is more challenging due to the high extrusion pressure. Extrusion parameters of the PE copolymer of this disclosure (e.g., die pressure, bubble stability, downgauging, output rates, etc.) are advantageously more similar to chromium based resins than typical metallocene based bimodal resins, and film strength properties of the PE copolymer of this disclosure are advantageously similar to features of typical metallocene based bimodal resins.

In an embodiment, the PE copolymer of this disclosure can advantageously display improved processability similar to chromium based resins while advantageously preserving film strength properties of metallocene based bimodal resins. Additional advantages of the PE copolymer of this disclosure can be apparent to one of skill in the art viewing this disclosure.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

All experimental bimodal metallocene resins (samples #1 through #26) were made in a continuous loop reactor. Three experimental resins of the type disclosed herein, designated sample #1, sample #2 and sample #3 were prepared using the conditions outlined in Table 1.

TABLE 1

| | Sample# | | |
|---|---|---|---|
| | 1 | 2 | 3 |
| Activator-Support | Sulfated Alumina | Sulfated Alumina | Sulfated Alumina |
| Feeder size (cc) | 0.9 | 0.9 | 0.9 |
| Activator-Support to reactor (rounds/hr) | 34 | 33 | 91 |
| Metallocene A to reactor based on i-C4 (ppm) | 1 | 1 | 0.86 |
| Metallocene B to reactor based on i-C4 (ppm) | 1.25 | 1.26 | 0.91 |
| Autoclave residence time (Min) | 30 | 30 | 31 |
| TIBA to Reactor based on i-C4 (ppm) | 76 | 77 | 91 |
| Rx Temp (° F.) | 192 | 201 | 198 |
| Ethylene (mol %) | 13.7 | 12.7 | 12.35 |
| 1-hexene (mol %) | 0.82 | 0.69 | 0.64 |
| H$_2$ feed rate (lb/hr) | 0.0052 | 0.0052 | 0.0121 |
| Ethylene feed rate (lb/hr) | 50 | 52 | 42 |
| 1-Hexene feed rate (lb/hr) | 1.8 | 1.7 | 0.75 |
| Total i-C4 flow rate (lb/hr) | 52 | 52 | 62.4 |
| Solids concentration (wt %) | 43.8 | 44.7 | 36.9 |
| Polymer production (lb/hr) | 46.7 | 48.4 | 39.3 |
| Density (g/cc) | 0.9459 | 0.9427 | 0.9505 |
| HLMI (g/10 min) | 22.6 | 10.9 | 6.9 |

The structures for the catalysts from Table 1 are as follows:

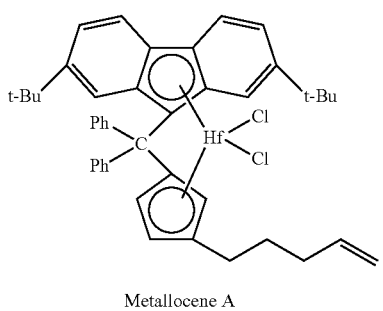

Metallocene A

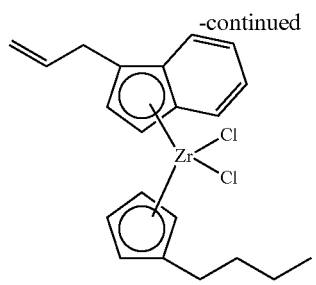

Metallocene B

The catalysts for samples #4 through #26 are listed below:

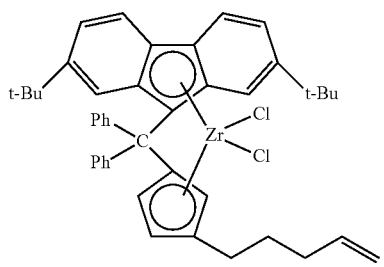

Metallocene C

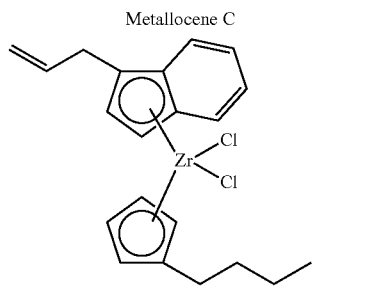

Metallocene B

Sample #27 is a commercial resin based on chromium catalyst technology. The novel resins (samples #1 and #2) were compared with 25 resins, designated samples #3 through #27. The 25 resins were 24 bimodal metallocene resins of different molecular compositions and one commercial Cr-based resin.

Resin properties, such as HLMI, density, $M_n$, $M_w$, $M_z$, $M_w/M_n$ ratio, and $M_z/M_w$ ratio, for both the experimental resins and the comparative resins are presented in Table 2.

TABLE 2

| Sample ID# | HLMI g/10 min | Density g/cc | $M_n$ kg/mol | $M_w$ kg/mol | $M_z$ kg/mol | $M_w/M_n$ | $M_z/M_w$ |
|---|---|---|---|---|---|---|---|
| 1 | 22.6 | 0.9459 | 20.1 | 310.3 | 2141.4 | 15.4 | 6.9 |
| 2 | 10.9 | 0.9427 | 20.6 | 374.0 | 2048.2 | 18.2 | 5.5 |
| 3 | 6.9 | 0.9505 | 8.8 | 318.8 | 1376.4 | 36.3 | 4.3 |
| 4 | 5.8 | 0.9395 | 18.3 | 218.6 | 713.7 | 12.0 | 3.3 |
| 5 | 6.2 | 0.9390 | 27.3 | 239.0 | 854.4 | 8.8 | 3.6 |
| 6 | 6.2 | 0.9380 | 28.4 | 241.3 | 810.7 | 8.5 | 3.4 |
| 7 | 6.4 | 0.9370 | 27.0 | 229.4 | 880.8 | 8.5 | 3.8 |
| 8 | 6.8 | 0.9390 | 25.0 | 221.6 | 810.3 | 8.9 | 3.7 |
| 9 | 5.8 | 0.9345 | 19.6 | 219.1 | 661.3 | 11.2 | 3.0 |
| 10 | 7.4 | 0.9338 | 28.7 | 209.6 | 621.9 | 7.3 | 3.0 |

TABLE 2-continued

| Sample ID# | HLMI g/10 min | Density g/cc | $M_n$ kg/mol | $M_w$ kg/mol | $M_z$ kg/mol | $M_w/M_n$ | $M_z/M_w$ |
|---|---|---|---|---|---|---|---|
| 11 | 6.0 | 0.9343 | 24.7 | 217.4 | 641.6 | 8.8 | 3.0 |
| 12 | 7.2 | 0.9341 | 18.1 | 205.9 | 624.4 | 11.4 | 3.0 |
| 13 | 6.6 | 0.9338 | 30.7 | 205.5 | 604.5 | 6.7 | 2.9 |
| 14 | 7.6 | 0.9348 | 20.9 | 198.4 | 603.1 | 9.5 | 3.0 |
| 15 | 9.6 | 0.9347 | 17.1 | 198.4 | 655.3 | 11.6 | 3.3 |
| 16 | 9.6 | 0.9341 | 16.5 | 191.7 | 621.2 | 11.7 | 3.2 |
| 17 | 10.7 | 0.9350 | 15.6 | 180.3 | 579.9 | 11.6 | 3.2 |
| 18 | 8.5 | 0.9353 | 20.5 | 200.1 | 619.8 | 9.7 | 3.1 |
| 19 | 5.9 | 0.9306 | 17.7 | 198.9 | 585.8 | 11.2 | 2.9 |
| 20 | 17.8 | 0.9273 | 11.1 | 185.5 | 670.5 | 16.7 | 3.6 |
| 21 | 13.8 | 0.9435 | 10.6 | 191.5 | 668.1 | 18.1 | 3.5 |
| 22 | 15.0 | 0.9386 | 10.6 | 192.2 | 724.6 | 18.2 | 3.8 |
| 23 | 6.0 | 0.9343 | 8.9 | 201.1 | 656.5 | 22.7 | 3.3 |
| 24 | 9.5 | 0.9352 | 12.5 | 200.6 | 693.3 | 16.1 | 3.5 |
| 25 | 10.1 | 0.9364 | 11.9 | 200.3 | 687.1 | 16.8 | 3.4 |
| 26 | 7.5 | 0.9351 | 11.8 | 209.0 | 749.9 | 17.8 | 1.8 |
| 27 | 23.1 | 0.9385 | 12.1 | 186.5 | 1220.3 | 15.4 | 6.5 |

Rheology measurements were made as follows; strains were generally maintained at a single value throughout a frequency sweep, but larger strain values were used for low viscosity samples to maintain a measurable torque. Smaller strain values were used for high viscosity samples to avoid overloading the torque transducer and to remain within the linear viscoelastic limits of the sample. The instrument automatically reduced the strain at high frequencies if necessary to keep from overloading the torque transducer. These data were fit to the Carreau-Yasuda equation (4) to determine zero shear viscosity ($\eta_0$). To facilitate model fitting, the power law constant n was held at a constant value of 0.1818. The results of the rheology measurements (e.g., $\eta_0$, $\eta_{100}$) are presented for samples #1 and #2 in Table 3. Comparison data for samples #3 through #27 are also displayed in Table 3, and said comparison data were obtained with a Rheometrics ARES rheometer using parallel plate geometry in a dynamic oscillatory mode at 190° C. The shear rheology results ($\eta^*$ vs. $\omega$) were fitted to the Carreau-Yasuda model.

TABLE 3

| Sample ID# | $\eta_0$ Pa-s | $\eta_{100}$ Pa-s | Dart Drop Strength g | Elmendorf MD Tear g | Elmendorf TD Tear g |
|---|---|---|---|---|---|
| 1 | 6.61E+06 | 1233 | 154 | 31 | 371 |
| 2 | 1.03E+06 | 1834 | 338 | 34 | 412 |
| 3 | 3.42E+05 | 2745 | 469 | 24 | 545 |
| 4 | 1.74E+05 | 2750 | 344 | 12 | 549 |
| 5 | 1.83E+05 | 2780 | 506 | 74 | 354 |
| 6 | 1.69E+05 | 2560 | 604 | 84 | 294 |
| 7 | 1.84E+05 | 2400 | 599 | 60 | 440 |
| 8 | 1.51E+05 | 2530 | 545 | 68 | 362 |
| 9 | 1.33E+05 | 2810 | 715 | 24 | 527 |
| 10 | 1.23E+05 | 2560 | 789 | 29 | 474 |
| 11 | 1.39E+05 | 2780 | 720 | 33 | 522 |
| 12 | 1.23E+05 | 2570 | 648 | 32 | 497 |
| 13 | 1.17E+05 | 2680 | 740 | 33 | 545 |
| 14 | 1.09E+05 | 2510 | 700 | 23 | 547 |
| 15 | 9.02E+04 | 2250 | 467 | 18 | 533 |
| 16 | 9.69E+04 | 2310 | 513 | 18 | 506 |
| 17 | 9.07E+04 | 2220 | 466 | 19 | 523 |
| 18 | 9.19E+04 | 2300 | 242 | 10 | 557 |
| 19 | 1.07E+05 | 2800 | 230 | 29 | 476 |
| 20 | 6.09E+04 | 1950 | 259 | 88 | 672 |
| 21 | 6.62E+04 | 2160 | 272 | 81 | 689 |
| 22 | 6.68E+04 | 2160 | 183 | 86 | 589 |
| 23 | 7.13E+04 | 2750 | 209 | 63 | 695 |
| 24 | 7.45E+04 | 2450 | 238 | 88 | 553 |
| 25 | 7.35E+04 | 2280 | 258 | 82 | 532 |
| 26 | 8.72E+04 | 2680 | 219 | 79 | 763 |
| 27 | 2.64E+05 | 1542 | 71 | 62 | 543 |

The experimental resins from Table 2 (e.g., samples #1 and #2) were formed into blown films using a Davis-Standard Blown Film, HDPE mode, with a 2 inch die, 0.035 inch die gap, at an output rate of 29 lb/hr, a 4:1 blow up ratio (BUR), a 14 inch freeze line (neck) height (7:1 freeze line height to die diameter ratio), an extrusion temperature profile of 190° C. to 210° C. across the extruder and die and 1.0 mil gauge. The thickness of the film can also be referred to as the film gauge. The properties of the film were evaluated and are also presented in Table 3. Comparison data for film properties for samples #3 through #27 are also displayed in Table 3, and said comparison data were measured per ASTM D1709 (dart) and ASTM D1922 (Elmendorf tear). The data in Table 3 indicate that the novel resins (samples #1 and #2) display improved processability similar to chromium based resins (sample #27) while preserving film strength properties of metallocene based bimodal resins as suggested by the dart value (samples #3 through #26).

Deconvolution of gel permeation chromatography (GPC) of samples #1 through #26 provided the fraction of LMW component present in each sample (LMW fr.), in the addition to several other parameters: LMW $M_w$, HMW $M_w$, HMW $M_w$/LMW $M_w$, and HMW fr./LMW fr. The deconvolution data are presented in Table 4 for samples #1 through #26.

TABLE 4

| Sample ID# | LMW fr. | LMW $M_w$ kg/mol | HMW $M_w$ kg/mol | HMW $M_w$/LMW $M_w$ | HMW fr./LMW fr. |
|---|---|---|---|---|---|
| 1 | 0.74 | 63 | 1223 | 19.32 | 0.35 |
| 2 | 0.74 | 63 | 1292 | 20.48 | 0.35 |
| 3 | 0.63 | 34 | 797 | 23.16 | 0.59 |
| 4 | 0.71 | 69 | 595 | 8.60 | 0.41 |
| 5 | 0.68 | 62 | 583 | 9.47 | 0.47 |
| 6 | 0.67 | 65 | 579 | 8.87 | 0.49 |
| 7 | 0.69 | 62 | 570 | 9.20 | 0.45 |
| 8 | 0.68 | 60 | 546 | 9.17 | 0.47 |
| 9 | 0.67 | 67 | 544 | 8.13 | 0.49 |
| 10 | 0.70 | 70 | 543 | 7.75 | 0.43 |
| 11 | 0.68 | 69 | 543 | 7.82 | 0.47 |
| 12 | 0.69 | 67 | 532 | 7.98 | 0.45 |
| 13 | 0.70 | 70 | 524 | 7.50 | 0.43 |
| 14 | 0.69 | 62 | 517 | 8.33 | 0.45 |
| 15 | 0.69 | 58 | 514 | 8.83 | 0.45 |
| 16 | 0.70 | 59 | 506 | 8.63 | 0.43 |
| 17 | 0.73 | 61 | 506 | 8.26 | 0.37 |
| 18 | 0.67 | 54 | 502 | 9.27 | 0.49 |
| 19 | 0.67 | 63 | 483 | 7.63 | 0.49 |
| 20 | 0.65 | 33 | 453 | 13.73 | 0.54 |
| 21 | 0.61 | 31 | 434 | 14.09 | 0.64 |
| 22 | 0.61 | 30 | 422 | 14.07 | 0.64 |
| 23 | 0.55 | 25 | 408 | 16.33 | 0.82 |
| 24 | 0.57 | 28 | 404 | 14.62 | 0.75 |
| 25 | 0.56 | 26 | 398 | 15.16 | 0.79 |
| 26 | 0.54 | 26 | 397 | 15.17 | 0.85 |

The data in Table 4 indicate that the novel resins (samples #1 and #2) display an unique pattern of the ratio of the HMW component to the LMW component and higher molecular weight of the HMW component which translates into the effective combination of bubble stability and low extrusion pressure, when compared to samples #3 through #26.

Example 2

The experimental resin designated sample #2 in Example 1 was compared to samples #17 and #18 of Example 1, as well as to the chromium-based resin designated sample #27. Sample #27 was a commercially available resin.

Gel permeation chromatography (GPC) of sample #2 was carried out and compared to samples #17, #18, and #27, as shown in FIG. 1. Sample #2 displays an unique MWD profile when compared to the other resins. The HMW component of the copolymer has a higher molecular weight and the separation between the LMW and the HMW components is wider than in the other bimodal resins.

Sample #27 was formed into blown film as described in Example 1 for samples #1 through #26. Film properties, as well as copolymer properties for sample #2 were compared to samples #17, #18, and #27, and the data are displayed in Table 5.

TABLE 5

| | Sample ID# | | | |
|---|---|---|---|---|
| | Sample #2 | Sample #27 | Sample #18 | Sample #17 |
| Catalyst | Dual Metallocene | Chromium | Dual Metallocene | Dual Metallocene |
| HLMI [g/10 min] | 10.9 | 23.1 | 8.5 | 10.7 |
| Density [g/cc] | 0.9427 | 0.9385 | 0.9353 | 0.9350 |
| GPC | | | | |
| $M_n$ | 20.6 | 12.1 | 20.5 | 15.6 |
| $M_w$ | 374.0 | 186.5 | 200.1 | 180.3 |
| $M_z$ | 2048.2 | 1220.3 | 619.8 | 579.9 |
| $M_w/M_n$ | 18.2 | 15.4 | 9.7 | 11.6 |
| $M_z/M_w$ | 5.5 | 6.5 | 3.1 | 3.2 |
| Dynamic Rheology (190° C.) | | | | |
| $\eta_0$ [Pa-s] | 1.03E+06 | 2.64E+05 | 9.19E+04 | 9.07E+04 |
| $\eta_{100}$ [Pa-s] | 1.83E+03 | 1.54E+03 | 2.30E+03 | 2.22E+03 |
| Processability* | | | | |
| Pressure (psi) | 3000 | 2667 | 3700 | 3700 |
| Film Properties (1-mil) | | | | |
| Dart Drop Strength [g] | 338 | 71 | 242 | 466 |
| Elmendorf MD Tear [g] | 34 | 62 | 10 | 19 |
| Elmendorf TD Tear [g] | 412 | 543 | 557 | 523 |

The data in Table 5 indicate that the novel resin (sample #2) displays improved processability similar to the chromium based resin (sample #27) as highlighted by $\eta_{100}$ (viscosity at 100 s$^{-1}$) and the extrusion pressure while preserving film strength properties of metallocene based bimodal resins (samples #17 and #18) as highlighted by the dart drop value.

Figure 2:
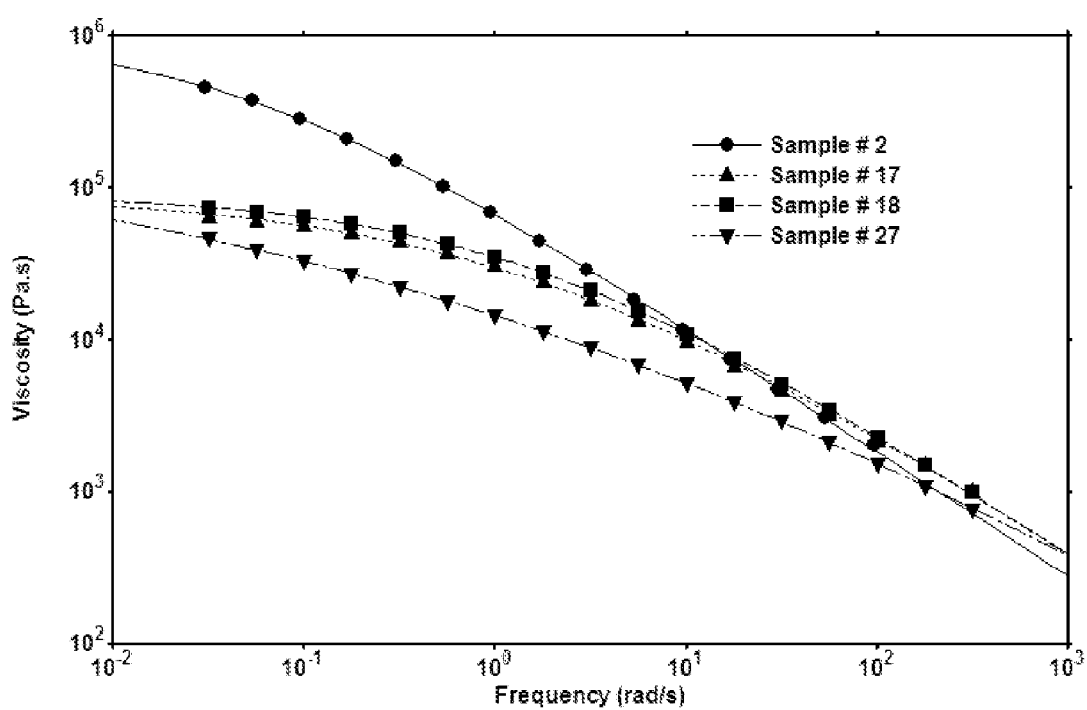
FIG. 2 is a plot of dynamic melt viscosity measured at 190° C. versus frequency for the samples from Example 2.

Rheology measurements were performed on sample #27 as described in Example 1. Dynamic melt viscosity was recorded at 190° C. for all samples. The dynamic melt viscosity was monitored for sample #2, and the data were compared to samples #17, #18, and #27, as shown in FIG. 2. Sample #2 has a distinct dynamic melt viscosity profile when compared to the other bimodal samples whereas the zero-shear viscosity ($\eta_0$) is higher (better bubble stability) and processability ($\eta_{100}$) is lower (lower extrusion pressure).

ADDITIONAL DISCLOSURE

The following enumerated embodiments are provided as non-limiting examples.

A first embodiment, which is a bimodal polyethylene copolymer comprising a lower molecular weight (LMW) component and a higher molecular weight (HMW) component, the copolymer having a z-average molecular weight ($M_z$) of from about 1,000 kg/mol to about 2,500 kg/mol, a weight fraction of the LMW component (LMW fr.) of from about 0.60 to 0.85, a ratio of a weight average molecular weight ($M_w$) of the HMW component (HMW $M_w$) to a $M_w$ of the LMW component (LMW $M_w$) of from about 14 to about 25, a zero shear viscosity ($\eta_0$) of from about $5 \times 10^5$ Pa-s to about $1 \times 10^7$ Pa-s and a HMW $M_w$ of from about 800 kg/mol to about 1,500 kg/mol.

A second embodiment, which is the copolymer of the first embodiment having a processability characterized by a pressure index of greater than about $(1.1 \times \eta_{100} + 50)$ and a bubble stability index of less than about $(0.96 \times (\eta_0/10000) - 15)$, wherein $\eta_{100}$ is the viscosity of the copolymer expressed in Pa-s and measured at 190° C. and a shear rate of 100 rad/s.

A third embodiment, which is the copolymer of the second embodiment wherein the pressure index is defined by following equation: pressure index=$5737-563*(HMW\ M_w/LMW\ M_w)-209*(HMW\ fr./LMW\ fr.)+7*M_z-1234*M_z/M_w+404*(HMW\ M_w/LMW\ M_w*HMW\ fr./LMW\ fr.)-0.22*(HMW\ M_w/LMW\ M_w*M_z)+139*(HMW\ M_w/LMW\ M_w*M_z/M_w)+2*(HMW\ fr./LMW\ fr.*M_z)-1591*(HMW\ fr./LMW\ fr.*M_z/M_w)-0.64*(M_z*M_z/M_w)$, wherein HMW fr. is a weight fraction of the HMW component.

A fourth embodiment, which is the copolymer of any of the second through the third embodiments wherein the bubble stability index is defined by following equation: bubble stability index=$1.31 \times 10^4 - 2.76 \times 10^3*(HMW\ M_w/LMW\ M_w) - 1.46 \times 10^5*(HMW\ fr./LMW\ fr.) + 4.16 \times 10^2*M_z - 2.43 \times 10^4*M_z/M_w$.

A fifth embodiment, which is the copolymer of any of the first through the fourth embodiments comprising an alpha olefin comonomer.

A sixth embodiment, which is the copolymer of the fifth embodiment wherein the alpha olefin comonomer comprises 1-hexene.

A seventh embodiment, which is the copolymer of any of the first through the sixth embodiments having a $M_w$ from about 200 kg/mol to 600 kg/mol.

An eighth embodiment, which is the copolymer of any of the first through the seventh embodiments having a $M_z/M_w$ ratio from about 4 to about 8.

A ninth embodiment, which is the copolymer of any of the first through the eighth embodiments having a $M_w/M_n$ ratio of from about 10 to about 25.

A tenth embodiment, which is the copolymer of any of the first through the ninth embodiments wherein the LMW component has a weight average molecular weight of from about 40 kg/mol to about 80 kg/mol.

An eleventh embodiment, which is the copolymer of any of the first through the tenth embodiments wherein the HMW component has a weight average molecular weight of from about 1,000 kg/mol to about 1,450 kg/mol.

A twelfth embodiment, which is the copolymer of any of the first through the eleventh embodiments which when tested in accordance with ASTM D1238 has a high load melt index ($I_{21.6}$) of from about 8 g/10 min to about 30 g/10 min.

A thirteen embodiment, which is the copolymer of any of the first through the twelfth embodiments which when tested in accordance with ASTM D1505 has a density of from about 0.930 g/cc to about 0.950 g/cc.

A fourteenth embodiment, which is the copolymer of any of the first through the thirteenth embodiments having a $\eta_{100}$ of from about 1,000 Pa-s to about 2,500 Pa-s.

A fifteenth embodiment, which is the copolymer of any of the first through the fourteenth embodiments having a number average molecular weight ($M_n$) of from about 15 kg/mol to about 30 kg/mol.

A sixteenth embodiment, which is the copolymer of any of the first through the fifteenth embodiments having a HMW fr./LMW fr. ratio of from about 0.20 to about 0.50.

A seventeenth embodiment, which is the copolymer of any of the first through the sixteenth embodiments which when tested in accordance with ASTM D1709 has a dart drop strength ranging from about 100 g to about 450 g.

An eighteenth embodiment, which is the copolymer of any of the first through the seventeenth embodiments which when tested in accordance with ASTM D1922 has an Elmendorf tear strength in the machine direction ranging from about 25 g to about 75 g.

A nineteenth embodiment, which is the copolymer of any of the first through the eighteenth embodiments which when tested in accordance with ASTM D1922 has an Elmendorf tear strength in the transverse direction ranging from about 300 g to about 500 g.

A twentieth embodiment, which is a film made from the copolymer of any of the first through the nineteenth embodiments.

A twenty-first embodiment, which is a food packaging comprising the film of the twentieth embodiment.

Without further elaboration, it is believed that one skilled in the art can, using the description herein, utilize the present invention to its fullest extent. While inventive aspects have been shown and described, modifications thereof can be made by one skilled in the art without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The disclosures of all patents, patent applications, and publications cited herein are hereby incorporated by reference, to the extent that they provide exemplary, procedural or other details supplementary to those set forth herein.

What is claimed is:

1. A bimodal polyethylene copolymer comprising a lower molecular weight (LMW) component and a higher molecular weight (HMW) component, the copolymer having a z-average molecular weight ($M_z$) of from about 1,000 kg/mol to about 2,500 kg/mol, a weight fraction of the LMW component (LMW fr.) of from about 0.60 to 0.85, a ratio of a weight average molecular weight ($M_w$) of the HMW component (HMW $M_w$) to a $M_w$ of the LMW component (LMW $M_w$) of from about 14 to about 25, a zero shear viscosity ($\eta_0$) of from about $5\times10^5$ Pa-s to about $1\times10^7$ Pa-s and a HMW $M_w$ of from about 800 kg/mol to about 1,500 kg/mol, wherein the copolymer is prepared using a residence time in a polymerization reactor of equal to or greater than about 30 minutes.

2. The copolymer of claim 1 having a processability characterized by a pressure index of greater than about ($1.1\times\eta_{100}+50$) and a bubble stability index of less than about ($0.96\times(\eta_0/10000)-15$), wherein $\eta_{100}$ is the viscosity of the copolymer expressed in Pas and measured at 190° C. and a shear rate of 100 rad/s.

3. The copolymer of claim 2 wherein the pressure index is defined by following equation: pressure index=$5737-563*$(HMW $M_w$/LMW $M_w$)$-209*$(HMW fr./LMW fr.)$+7*M_z-1234*M_z/M_w+404*$(HMW $M_w$/LMW $M_w$*HMW fr./LMW fr.)$-0.22*$(HMW $M_w$/LMW $M_w*M_z$)$+139*$(HMW $M_w$/LMW $M_w*M_z/M_w$)$+2*$(HMW fr./LMW fr.$*M_z$)$-1591*$(HMW fr./LMW fr.$*M_z/M_w$)$-0.64*(M_z*M_z/M_w)$, wherein HMW fr. is a weight fraction of the HMW component.

4. The copolymer of claim 2 wherein the bubble stability index is defined by following equation: bubble stability index=$1.31\times10^4-2.76\times10^3*$(HMW $M_w$/LMW $M_w$)$-1.46\times10^5*$(HMW fr./LMW fr.)$+4.16\times10^2*M_z-2.43\times10^4*M_z/M_w$.

5. The copolymer of claim 1 comprising an alpha olefin comonomer.

6. The copolymer of claim 5 wherein the alpha olefin comonomer comprises 1-hexene.

7. The copolymer of claim 1 having a $M_w$ from about 200 kg/mol to 600 kg/mol.

8. The copolymer of claim 1 having a $M_z/M_w$ ratio from about 4 to about 8.

9. The copolymer of claim 1 having a $M_w/M_n$ ratio of from about 10 to about 25.

10. The copolymer of claim 1 wherein the LMW component has a weight average molecular weight of from about 40 kg/mol to about 80 kg/mol.

11. The copolymer of claim 1 wherein the HMW component has a weight average molecular weight of from about 1,000 kg/mol to about 1,450 kg/mol.

12. The copolymer of claim 1 which when tested in accordance with ASTM D1238 has a high load melt index ($I_{21.6}$) of from about 8 g/10 min to about 30 g/10 min.

13. The copolymer of claim 1 which when tested in accordance with ASTM D1505 has a density of from about 0.930 glee to about 0,950 g/cc.

14. The copolymer of claim 1 having a moo of from about 1,000 Pa-s to about 2,500 Pa-s.

15. The copolymer of claim 1 having a number average molecular weight ($M_n$) of from about 15 kg/mol to about 30 kg/mol.

16. The copolymer of claim 1 having a HMW fr./LMW fr. ratio of from about 0.20 to about 0.50, wherein HMW fr. is a weight fraction of the HMW component.

17. The copolymer of claim 1 which when tested in accordance with ASTM D1709 has a dart drop strength ranging from about 100 g to about 450 g.

18. The copolymer of claim 1 which when tested in accordance with ASTM D1922 has an Elmendorf tear strength in the machine direction ranging from about 25 g to about 75 g.

19. The copolymer of claim 1 which when tested in accordance with ASTM D1922 has an Elmendorf tear strength in the transverse direction ranging from about 300 g to about 500 g.

20. A film made from the copolymer of claim 1.

21. A food packaging comprising the film of claim 20.

* * * * *